(12) United States Patent  
Taketomi

(10) Patent No.: US 12,477,049 B2  
(45) Date of Patent: Nov. 18, 2025

(54) HINGE SUPPORTING DEVICE AND ELECTRONIC EQUIPMENT USING THE SAME

(71) Applicant: KEM HONGKONG LIMITED, Kowloon (HK)

(72) Inventor: Yoshitaka Taketomi, Kanagawa (JP)

(73) Assignee: KEM HONGKONG LIMITED, Tsimshatsui (HK)

( * ) Notice: Subject to any disclaimer, the term of this patent is extended or adjusted under 35 U.S.C. 154(b) by 0 days.

(21) Appl. No.: 18/753,447

(22) Filed: Jun. 25, 2024

(65) Prior Publication Data

US 2025/0016254 A1 Jan. 9, 2025

(30) Foreign Application Priority Data

Jul. 3, 2023 (JP) .................. 2023-109313

(51) Int. Cl.
| | | |
|---|---|---|
| *H04M 1/02* | (2006.01) | |
| *F16C 11/04* | (2006.01) | |
| *G06F 1/16* | (2006.01) | |
| *E05D 11/10* | (2006.01) | |

(52) U.S. Cl.
CPC .......... *H04M 1/0216* (2013.01); *F16C 11/04* (2013.01); *G06F 1/1681* (2013.01); *E05D 11/10* (2013.01); *E05D 11/1078* (2013.01); *E05Y 2201/638* (2013.01)

(58) Field of Classification Search
CPC ..... G06F 1/1681; H04M 1/0216; F16C 11/04; E05D 11/1078
See application file for complete search history.

(56) References Cited

U.S. PATENT DOCUMENTS

| | | | |
|---|---|---|---|
| 9,540,855 B2* | 1/2017 | Kato | G06F 1/1618 |
| 10,231,347 B2* | 3/2019 | Seo | E05D 11/082 |
| 11,809,239 B2* | 11/2023 | Hwang | F16C 11/04 |
| 11,927,991 B2* | 3/2024 | Torres | E05D 3/16 |
| 11,977,421 B2* | 5/2024 | Yang | E05D 11/082 |
| 12,181,932 B2* | 12/2024 | Hsiang | G06F 1/1652 |
| 12,279,387 B2* | 4/2025 | Yun | G06F 1/1681 |
| 2020/0097051 A1* | 3/2020 | Liu | G06F 1/1652 |
| 2022/0070285 A1* | 3/2022 | Ge | H04M 1/0216 |
| 2023/0103700 A1* | 4/2023 | Park | G06F 1/1652 |
| | | | 361/679.01 |
| 2023/0221773 A1* | 7/2023 | Zhang | H04M 1/022 |
| | | | 361/679.27 |
| 2023/0229189 A1* | 7/2023 | Li | F16H 1/22 |
| 2023/0366248 A1* | 11/2023 | Chung | E05D 3/122 |

(Continued)

FOREIGN PATENT DOCUMENTS

| | | |
|---|---|---|
| JP | 2020-125841 A | 8/2020 |
| JP | 2022-072199 A | 5/2022 |

*Primary Examiner* — Jeffrey O'Brien
(74) *Attorney, Agent, or Firm* — Notaro, Michalos & Zaccaria P.C.

(57) ABSTRACT

A hinge holding device for firmly holding a pair of enclosures in an open or closed state has a base frame sandwiched between the pair of enclosures and supporting the pair of enclosures in an open or closed state, and a suction mechanism having a load generator disposed within at least one of the pair of enclosures. The suction mechanism generates a non-linear load between the base frame and one of the enclosures to maintain the open and closed state of one of the enclosures with respect to the base frame.

7 Claims, 8 Drawing Sheets

(56) References Cited

U.S. PATENT DOCUMENTS

| | | | |
|---|---|---|---|
| 2023/0421673 A1* | 12/2023 | Huang | G06F 1/1681 |
| 2024/0069604 A1* | 2/2024 | Xu | G06F 1/1652 |
| 2024/0401387 A1* | 12/2024 | Fan | G06F 1/1681 |

* cited by examiner

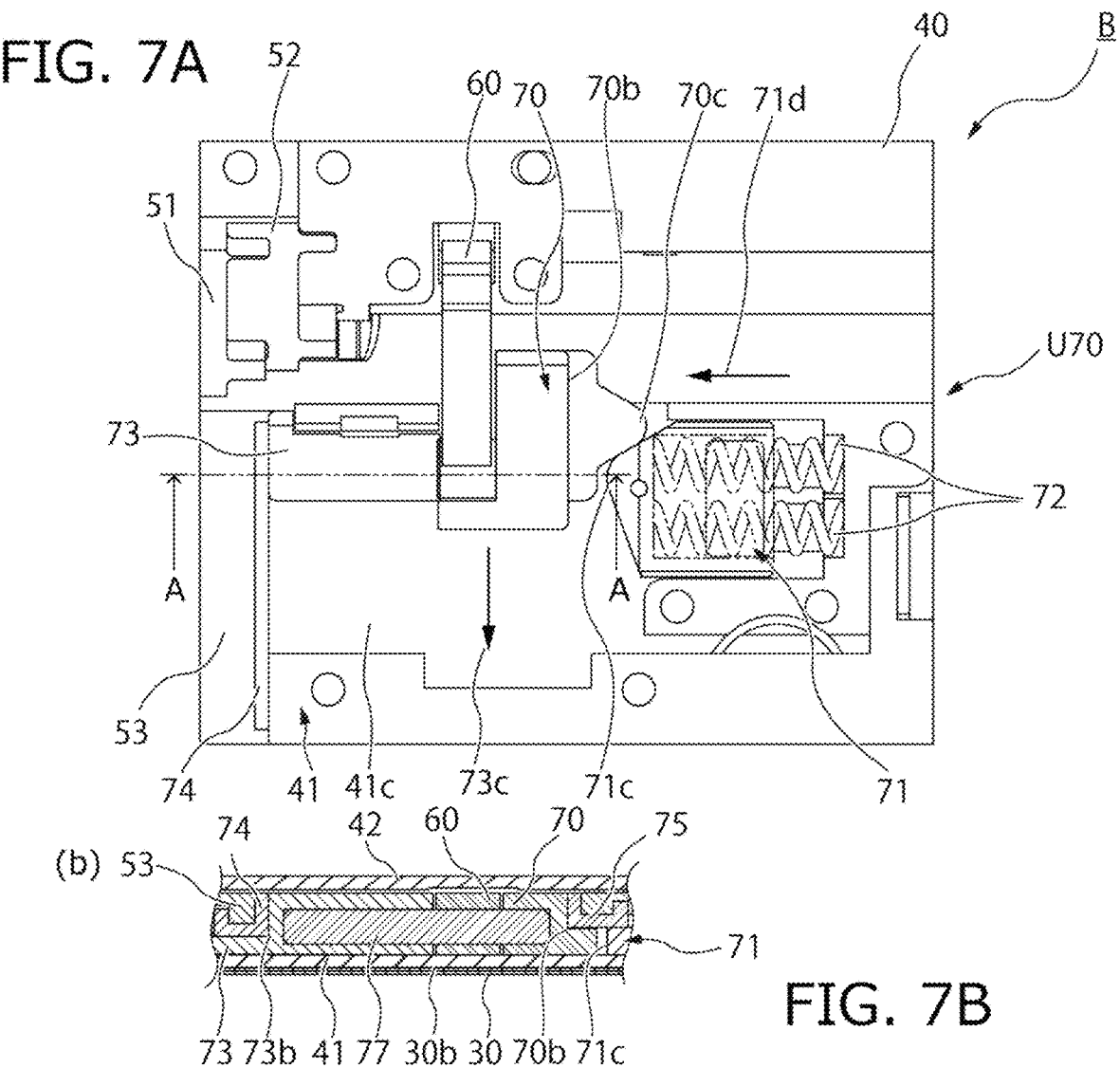

HINGE SUPPORTING DEVICE AND ELECTRONIC EQUIPMENT USING THE SAME

CROSS-REFERENCE TO RELATED APPLICATIONS

This patent application claims the benefit of and priority to Japanese Patent Application No. JP2023-109313, filed on Jul. 3, 2023, the disclosure of which is incorporated herein by reference in its entirety.

FIELD

The present invention relates to a hinge retaining device suitable for use in various electronic devices such as mobile phones, electronic diaries, PDAS, netbooks and furthermore notebook computers, as well as electronic devices using this hinge retaining device.

BACKGROUND

In recent years, electronic devices such as mobile phones, which consist of a single OLED flexible display sheet mounted across both surfaces of a pair of foldable housings, have been developed and are becoming available in the world. Such electronic equipment with a holding device that holds the open and closed states of the electronic equipment is known in the Japanese Patent Publication No. 2020-125841 and the Japanese Patent Publication No. 2022-072199.

In the electronic equipment described in the Japanese Patent Publication No. 2020-125841 and the Japanese Patent Publication No. 2022-072199, a holding device is provided in the base frame that opens and closes and supports the enclosure etc. In such a structure, it was not possible to provide sufficient holding force to the enclosure due to the mechanical loss of the multiple components interposed between the holding device and the enclosure.

SUMMARY

It is therefore an object of the present invention to provide a hinge holding device which firmly holds the enclosure in an open and closed state, and an electronic device using this hinge holding device.

To solve the above problem, the invention according is a hinge holding device for holding a pair of enclosures in an open or closed state, comprising a base frame sandwiched between the pair of enclosures and supporting the pair of enclosures in an open or closed state each, and a load generator disposed within at least one enclosure of the pair. The system comprises a suction mechanism in which the load generator is located within at least one of the enclosures. The suction mechanism generates a non-linear load between the base frame and one of the enclosures to maintain the open and closed state of the one enclosure with respect to the base frame.

The invention may be further characterised in that the suction mechanism has an arm that is pivotably supported by the base frame and slidably connected to one of the enclosures, and that the load generator controls the sliding movement between the arm and one of the enclosures.

The invention may be further characterised in that the load generator comprises a slider cam connected to the arm and sliding against one of the enclosures, a spring bracket on one of the enclosures that moves in a first direction different from the direction of sliding, and a spring bracket that moves in the first direction to bring the spring bracket into spring that brings it into contact with the slider cam.

The invention may be further characterised in that, for the load generator, the cam apex of the cam on the slider cam and the cam apex of the cam on the spring bracket are in contact in an intermediate state between the open and closed states of one of the enclosures with respect to the base frame.

The invention may be further characterised in that the load generator reduces the load exerted by the spring bracket on the slider cam as it approaches the open or closed state of one of the enclosures from the intermediate state.

The invention may be further characterised in that the slider cam is rotatably supported on the arm around an axis that is parallel to the open/close axis of one of the enclosures.

The invention may be further characterised in that the hinge holding device is used in an electronic device.

The enclosure may be securely held in the open and closed states. In some cases, the suction mechanism can be configured with a small number of parts. In some cases, the load generator can be configured with a small number of components. In some cases, the configuration can stabilise the opening and closing load of the suction mechanism.

BRIEF DESCRIPTION OF DRAWINGS

FIG. 1A is a diagrammatic view of a pair of enclosures in a closed state at 0° and FIG. 1B is a side view of a pair of enclosures in a closed state at 0°.

FIG. 6A is an exploded view of the load generator in the open state and FIG. 6B is a diagrammatic view of the spring bracket from the back.

FIG. 7A and FIG. 7B illustrate the configuration of the load generator, FIG. 7A is a plan view of the hinge holding device in the open state and FIG. 7B is an A-A sectional view of FIG. 7A.

FIG. 8A is a plan view of the load generator in the open state, FIG. 8B is a plan view of the load generator in the intermediate state and FIG. 8C is a plan view of the load generator in the closed state.

DETAILED DESCRIPTION

The hinge holding device of the present invention and the electronic equipment using this hinge holding device are described in detail below with reference to the accompanying drawings.

Figure 1A:
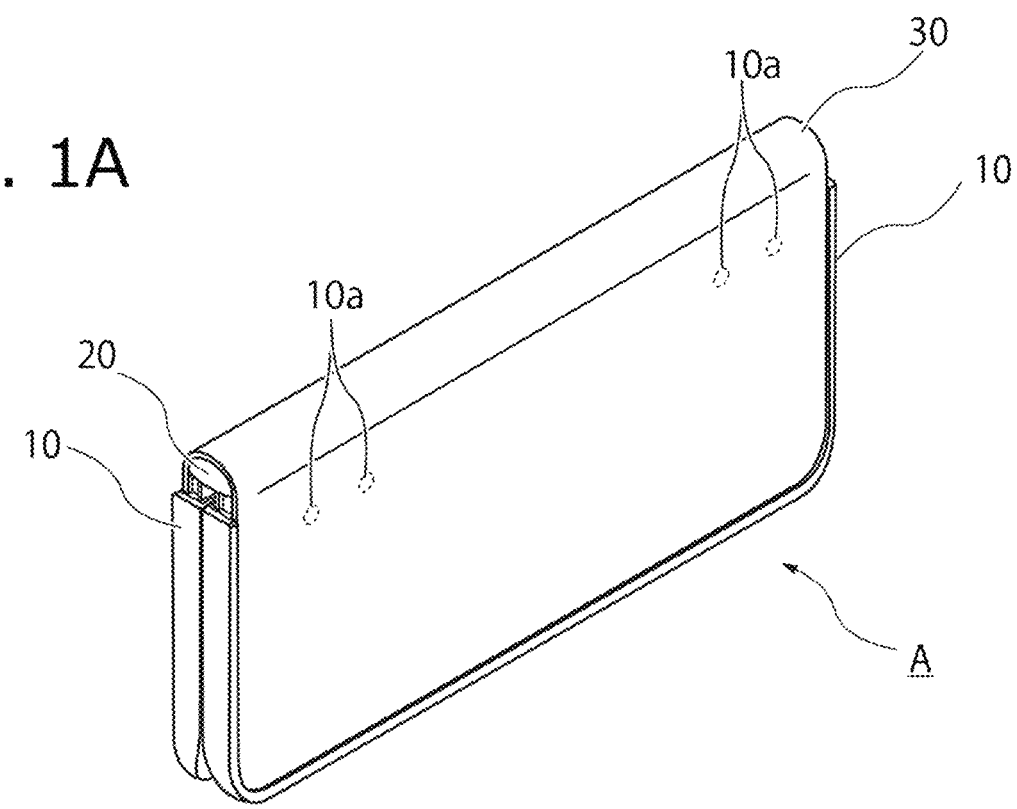
FIG. 1A and FIG. 1B show electronic equipment with a flexible display sheet using a hinge holding device according to the invention.
Figure 1B:
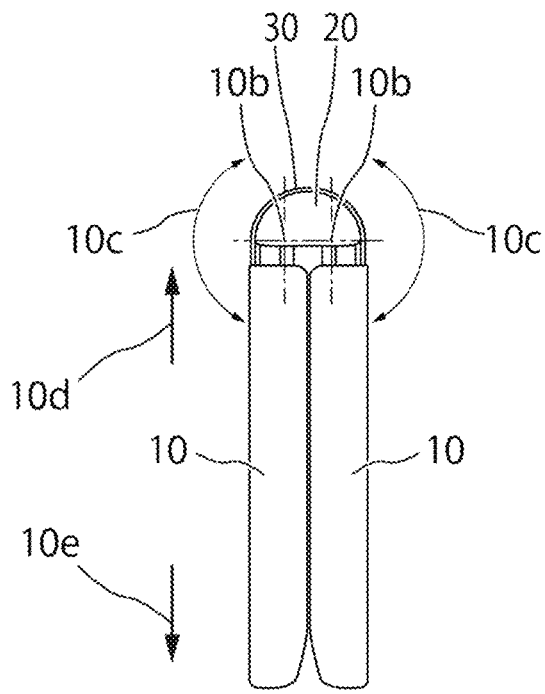
Figure 2:
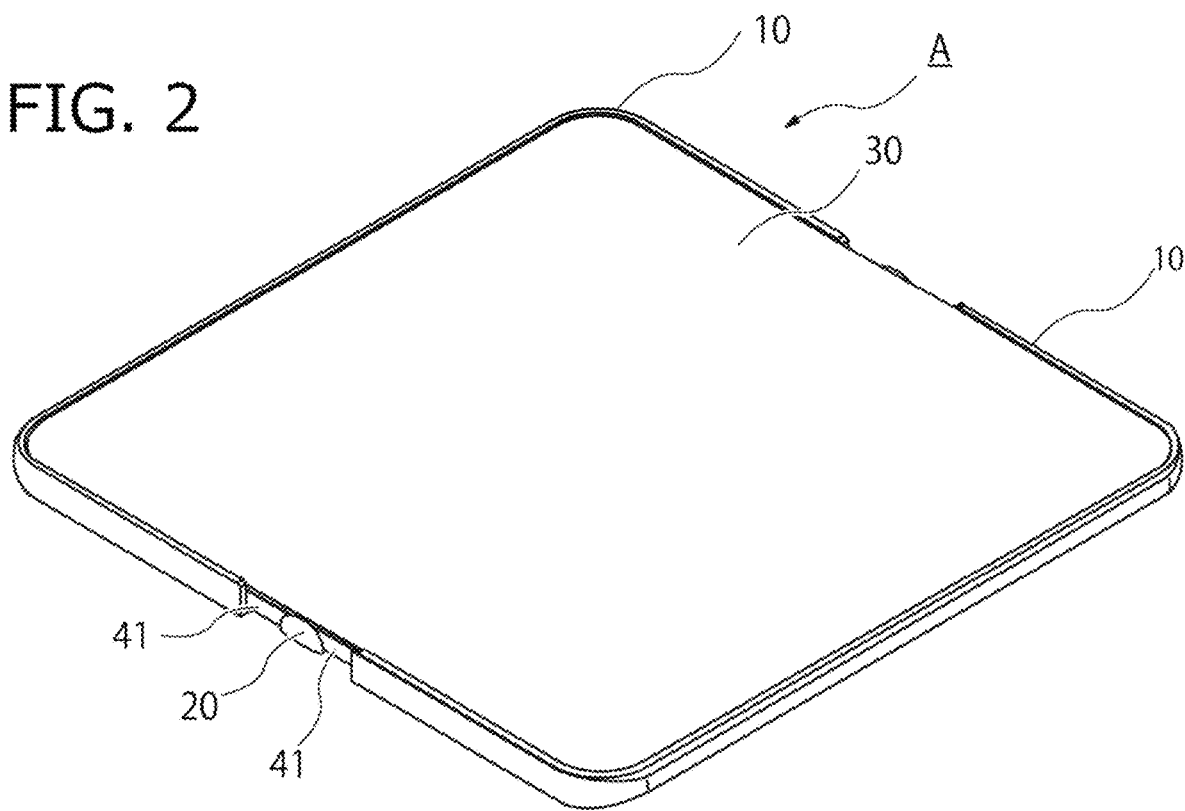
FIG. 2 is a diagrammatic view of a pair of enclosures of an electronic device with a flexible display sheet using the hinge holding device of the present invention in an open state of 180°.

FIG. 1A, FIG. 1B and FIG. 2 schematically show a mobile phone A (smartphone) as an example of an electronic device using a hinge holding device according to the invention.

FIG. 1A is a diagrammatic view of a pair of enclosures 10 in a closed state where the angle between each other is 0°.

The exterior of the mobile phone A comprises a pair of enclosures 10, a side cover 20 and a flexible display sheet 30, the pair of enclosures 10 being connected by a hinge unit B (not visible in FIG. 1A and FIG. 1B). As shown in the side view of FIG. 1B, the pair of enclosures 10 has the side cover 20 side shown by arrow 10d as the root of rotation and the free end side shown by arrow 10e as the tip of opening and closing. Here, the mounting holes 10a shown in dotted lines on the back of the flexible display sheet 30 are provided for screwing the enclosure 10 to the mounting plate 41 described below.

FIG. 2 is a diagrammatic view of a pair of enclosures 10 opened at an angle of 180° to each other. As shown in FIG. 1B and FIG. 2, the pair of enclosures 10 rotate around the axis of rotation 10b in the direction of arrow 10c. This rotary action causes a transition from the open state of FIG. 2 to the closed state of FIG. 1A.

Most of the components of the hinge unit B, including the hinge holding device, have an axisymmetrical shape with the longitudinal axis of the base frame 40. Therefore, in the following description, only one of the axisymmetrical shaped parts will be explained.

The hinge unit B consists of a guide device and a hinge holding device; the guide device is explained first.

Configuration of Guide System U50

Figure 3:
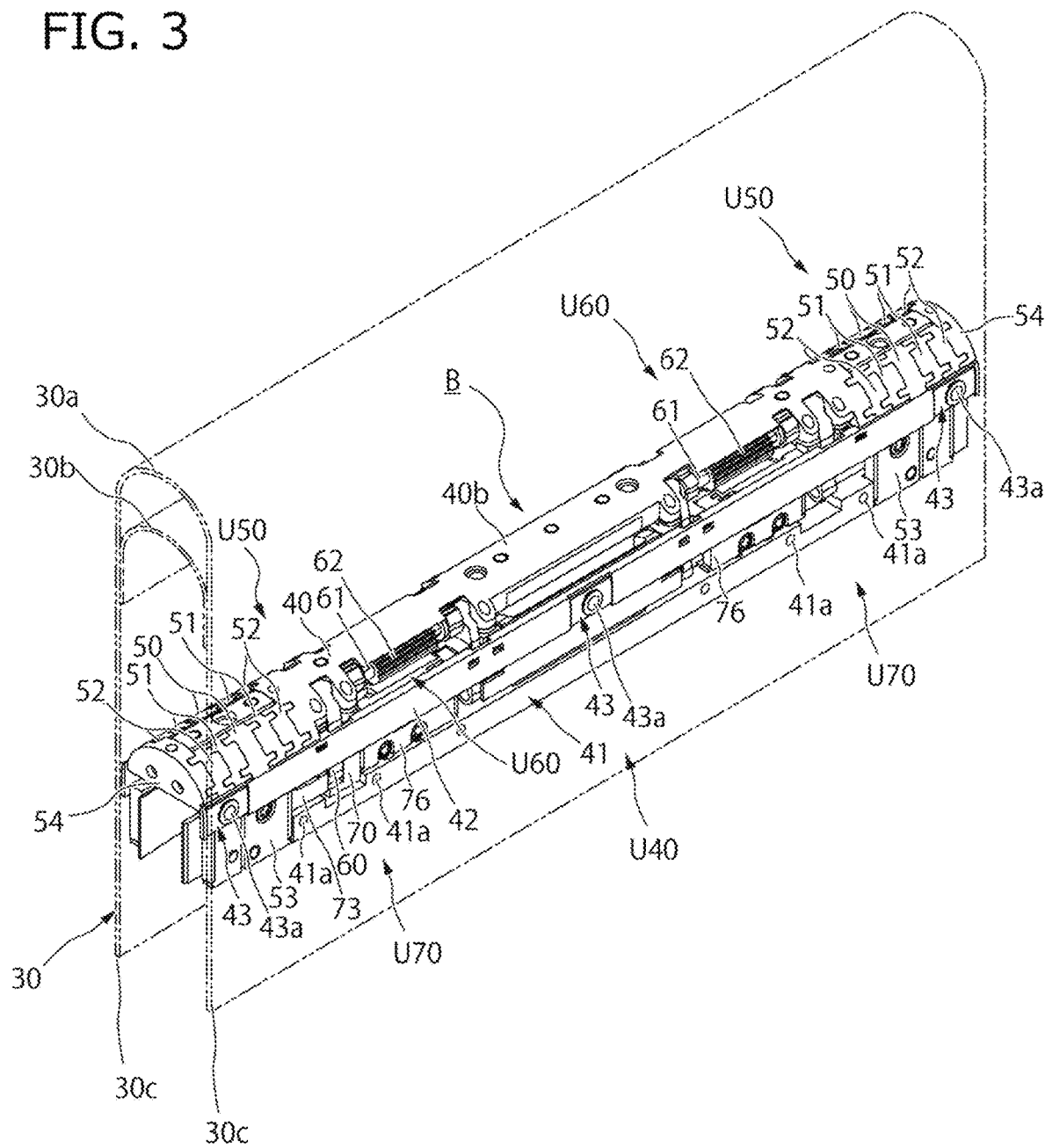
FIG. 3 is a diagrammatic view of the hinge unit in the closed state.

FIG. 3 is a diagram of the hinge unit B in the closed state. The flexible display sheet 30 is positioned along the surface 40b of the base frame 40. (In FIG. 3, the flexible display sheet 30 is shown floating above the surface 40b of the hinge unit B to distinguish it from the hinge unit B.) More specifically, a support sheet 30b supporting the flexible display sheet 30 is fixed on the surface 40b of the base frame 40 and on the support bar 42 to be described later using double-sided adhesive tape and a support bar holder 43, and a bent portion 30a of the flexible display sheet 30 is fixed with double-sided adhesive tape. (Support sheet 30b is also described floating above the surface 40b of hinge unit B.) Both ends 30c of the flexible display sheet 30 are also fixed to a pair of enclosures 10, not shown in FIG. 3.

The base frame 40 of the hinge unit B has a plurality of arc arms 50, 51 and 52, as well as end brackets 54 and arc arm brackets 53, which together constitute the guide system U50.

As mentioned above, support bar 42 is provided to support sheet 30b, and support sheet 30b and support bar 42 are attached to base frame 40 by mounting screws 43a in support bar holder 43. The side cover 20 in FIG. 1 is glued and fixed to the end bracket 54.

The frame U40 is made up of a base frame 40, a mounting plate 41, a support bar 42 and a support bar push 43.

Figure 4:
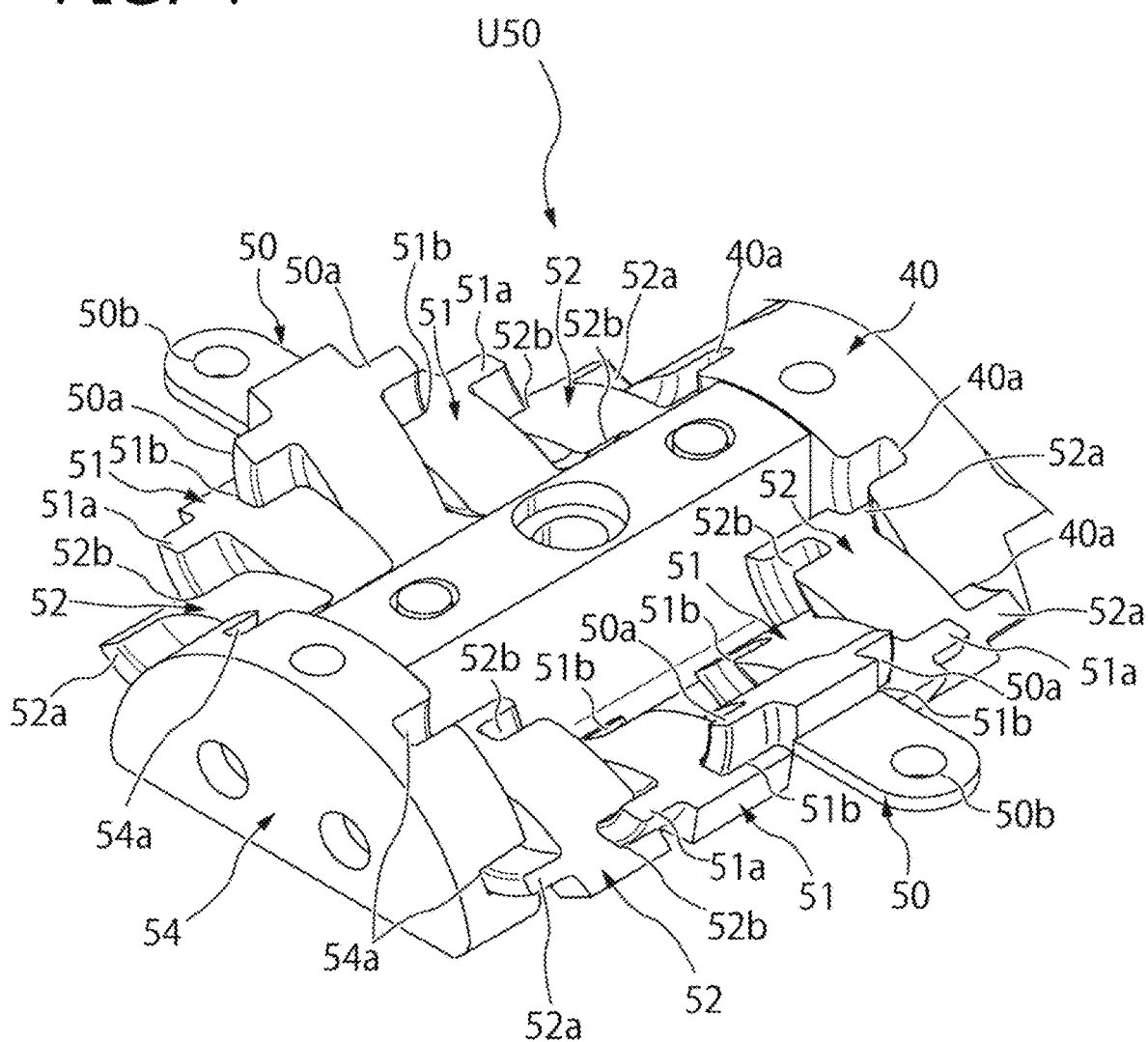
FIG. 4 is an enlarged diagram illustrating the guide system.

The guide device is provided for guiding the pair of enclosures 10 against the base frame 40 so that they can be opened and closed, FIG. 4 is an enlarged view in the open state illustrating the guide device U50. The combination of several arc arms 50, 51 and 52 is described using FIG. 4. The arc shaft 52a in the arc arm 52 fits into the arc groove 40a in the base frame 40. The arc groove 52b in the arc arm 52 is fitted with the arc shaft 51a in the arc arm 51. One of the pair of arc shafts 50a on the arc arm 50 fits into the arc groove 51b on the arc arm 51. On the opposite side of the arc arm 50, arc arms 51 and 52 are also assembled, with the arc shaft 52a in the arc arm 52 mating with the arc groove 54a in the end bracket 54. The mounting hole 50b at the end of the arc arm 50 screws into the mounting thread hole (not shown) of the arc arm bracket 53 in FIG. 6, and the mounting plate 41 is attached to the arc arm bracket 53.

Operation of Guide System U50

As can be seen from FIG. 4, the arc arm 50 is sandwiched between the base frame 40 and end brackets 54 via arc arms 51 and 52 at both ends. The arc arms 50, 51 and 52 then slide along their respective arc axes and arc grooves. The centre of rotation of the combined arc trajectories of the respective arc axes and arc grooves in the arc arms 50, 51 and 52 is the axis of rotation 10b in FIG. 1B. Thus, when the hinge mechanism is configured with arc sliding, not only does the rotating shaft become unnecessary, but also the rotary shaft 10b can be positioned freely. Therefore, the space for opening and closing and supporting a pair of enclosures 10 can be made compact. Furthermore, the combination of arc groove and arc shaft has a long mating length, so filling these gaps with appropriate grease creates good viscous resistance and enables high-quality opening and closing action.

The hinge retainer is provided for holding the pair of enclosures 10 against the base frame 40 at a predetermined angle, such as open or closed, and the suction mechanism in the hinge retainer sucks the pair of enclosures 10 in the open or closed direction when they are at an angle between the open and closed states, and hold the open or closed state.

The hinge holding device of the present invention is unique in that it is divided into a connection part U60 on the base frame 40 and a load generator U70 on the enclosure 10, with the connection part U60 being described first.

Composition of the Connection U60

Returning to FIG. 3, a synchronous gear 62 supported on the base frame 40, an arm shaft 61 coaxial with the synchronous gear 62 and regulated in rotation by a deformed shaft, and an arm 60 regulated in rotation by a deformed hole in the arm shaft 61 constitute the connection U60 of the hinge holding device.

Operation of the Connection U60

The synchronous gear 62 is engaged with the synchronous gear 62 (not shown) on the opposite side in FIG. 3 and is connected to the arm shaft 61 and arm 60 (both not shown) in the opposite side. Therefore, by operating any one of the 60 arms of a pair of arms, the other 60 arms will also swing synchronously. Here, arm 60 is connected to mounting plate 41 via arm pin 77, which is described below, and slide block 73. The mounting screw holes 41a in the pair of mounting plates 41 are screwed to the aforementioned mounting holes 10a (FIG. 1A) in the pair of enclosures 10 with an unshown screw. For this reason, the pair of enclosures 10 open and close synchronously under the action of the arms 60.

The load generation unit U70 is described next.

Composition of Load Generation Unit U70

Figure 5:
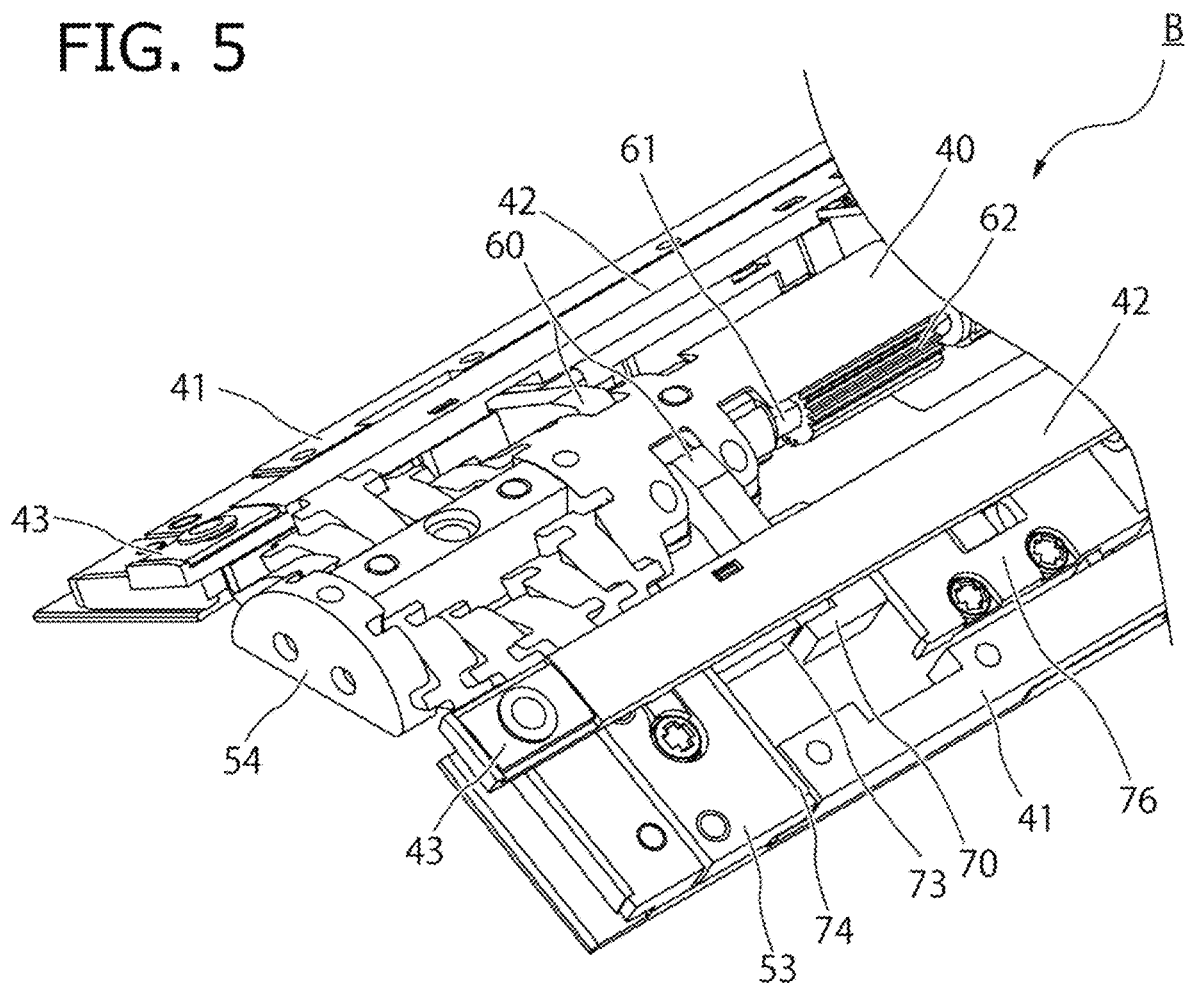
FIG. 5 is a diagrammatic view of the hinge holding device in its intermediate state.

FIG. 5 is a diagrammatic view of the hinge unit B in FIG. 3, where the mounting plate 41 is opened from the closed state of the hinge unit B and the mounting plate 41 is in an intermediate state, between the open and closed states. A diagrammatic view of the mounting plate 41 in the open state is shown in FIG. 6A.

Figure 6A:
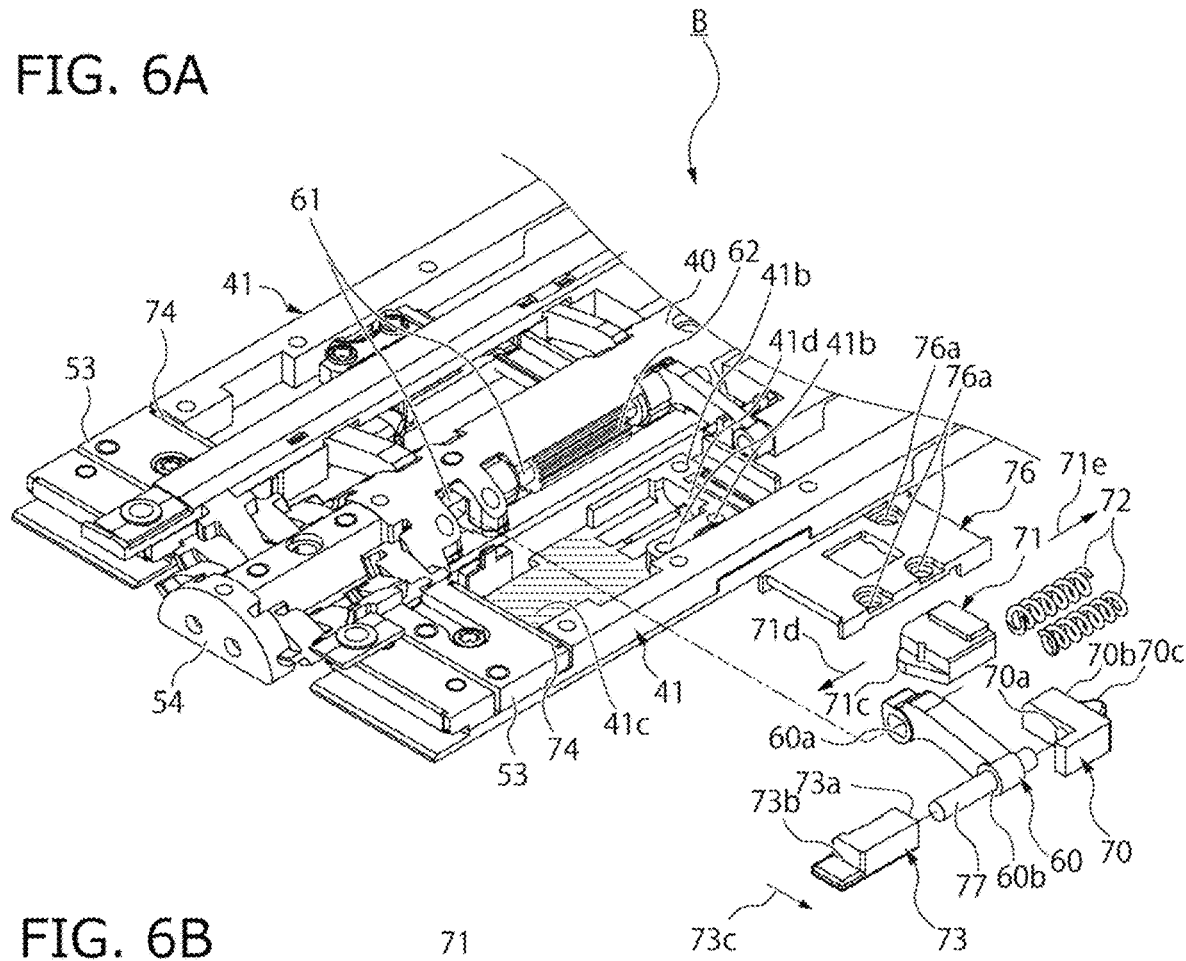
FIG. 6A and FIG. 6B are diagrammatic views of the hinge holding device.
Figure 6B:
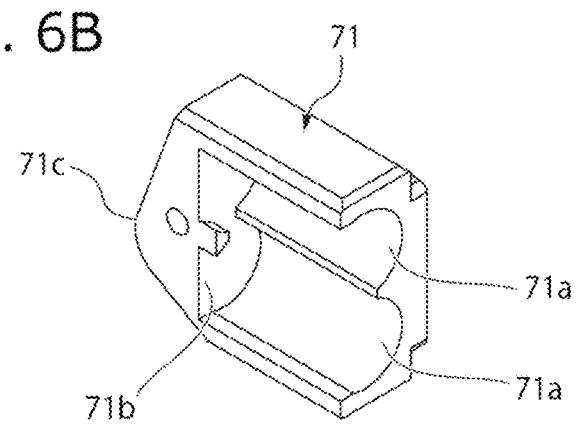

Here, the slider cam 70, spring bracket 71, spring 72, slide block 73, slide guides 74, 75, upper plate 76 and arm pin 77 constitute the load generator U70 of the hinge holding device, which together with arm 60 is represented in exploded view in FIG. 6A. Note that in FIG. 6A, support bar 42 is omitted on one mounting plate 41 in order to illustrate the load generator U70.

In FIG. 6A, the arm shaft hole 60a of arm 60 is fitted with arm shaft 61, both of which are regulated in rotation with each other due to their irregular shape. An arm pin 77 is rotatably fitted in the arm pin hole 60b. One end of arm pin 77 mates with arm pin hole 70a of slider cam 70 and the other end with arm pin hole 73a of slide block 73 (not visible in FIG. 6A). The slider cam 70 and the slide block 73 are located on the sliding surface 41c, the shaded area on the mounting plate 41. As mentioned above, an arm pin 77 is rotatably fitted in the arm pin hole 60b, which enables the slider cam 70 and slide block 73 to slide stably in arrow 73c and the opposite direction on the sliding surface 41c, regardless of the swing of the arm 60. That is, the slider cam 70 can stably slide on the sliding surface 41c on the mounting plate 41 by being rotatably supported by the arm pin 77 around an axis parallel to the opening/closing axis 10b of the enclosure 10 for the arm 60. The spring bracket 71 is arranged on the mounting plate 41 to be movable in the first direction of arrows 71d and 71e, which is a different direction from the sliding direction of the slider cam 70 (arrow 73c, and the opposite direction).

The slider cam 70 and spring bracket 71 each have a cam section, so that the cam apex 71c of the spring bracket 71 is opposite the cam apex 70c of the slider cam 70. A pair of springs 72 is also stored in the spring compartment 71a shown in FIG. 6B, and the pair of springs 72 is sandwiched between the spring stopper 41d of the mounting plate 41 and the spring stopper 71b of the spring bracket 71. Due to the above configuration, the spring bracket 71 is opposed to the slider cam 70 and is attached by a pair of springs 72 so that their cam sections are in contact with each other in the first direction (direction of arrows 71d, 71e). Upper plate 76 is provided to prevent spring bracket 71 from lifting due to the charging force generated by a pair of springs 72, and is screwed together with an unshown screw by mounting hole 76a and mounting screw hole 41b in mounting plate 41.

FIG. 7A is a plan view of the load generator U70 in the hinge holding device, and FIG. 7B shows a cross-sectional view of FIG. 7A cut in the A-A section, which is on the arm pin 77 (FIG. 6A) axis.

The slide block 73, which mates with the arm pin 77 in FIG. 7A and FIG. 7B, is located on the sliding surface 41c of the mounting plate 41 and the guide step 73b rubs against the slide guide 74. This guides the slide block 73 so that it can only slide in the sliding direction, arrow 73c, and in the opposite direction. Arm pin 77, which passes through arm 60, is mated with slider cam 70, which is positioned on sliding surface 41c of mounting plate 41. The guide step 70b of the slider cam 70 rubs against the slide guide 75 (not shown in FIG. 7A). This allows the slider cam 70 to be guided to slide only in the direction of arrow 73c and in the opposite direction.

Operation of Load Generator U70

Figure 8A:
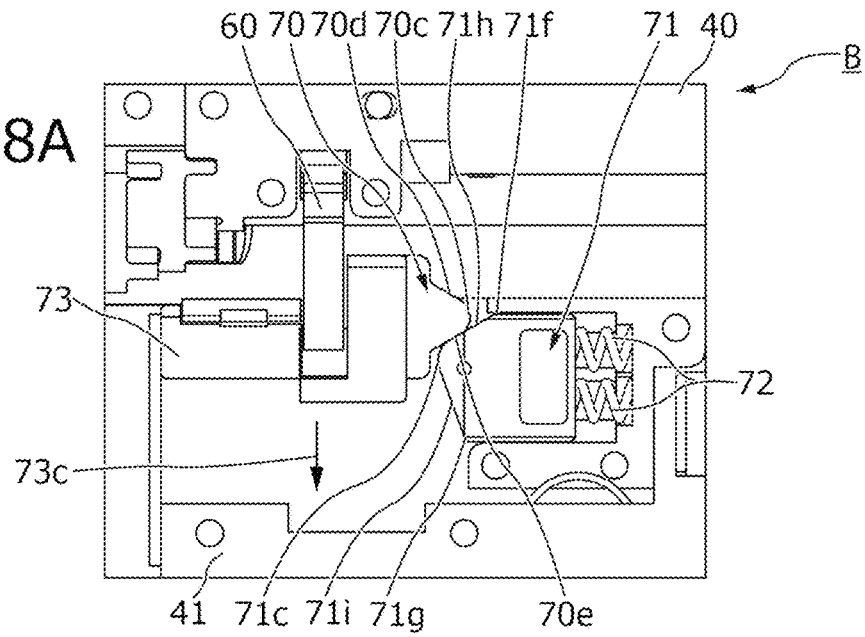
FIG. 8A to FIG. 8C illustrate the operation of the load generator.
Figure 8B:
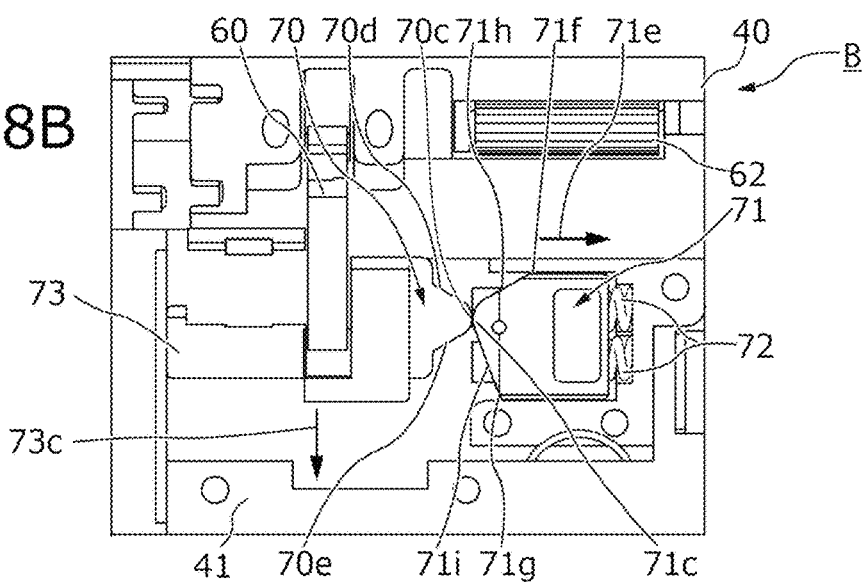
Figure 8C:
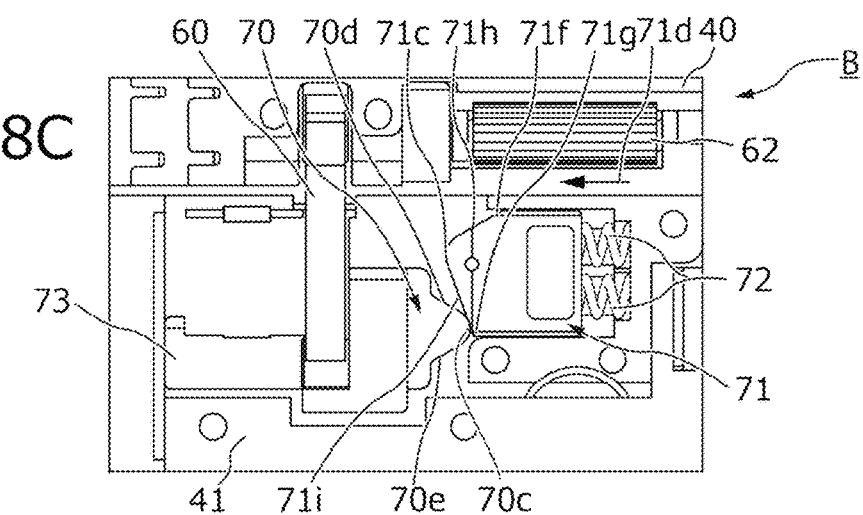

FIG. 8A to FIG. 8C illustrate the operation of load generator U70; FIG. 8A is a plan view of load generator U70 in its open state, FIG. 8B is a plan view of load generator U70 in its intermediate state and FIG. 8C is a plan view of load generator U70 in its closed state.

When the operation of closing the pair of enclosures 10 is started from the open state of FIG. 8A to the intermediate state, the slider cam 70 and the slide block 73 are pushed by the arm 60 and the arm pin 77 (not shown in FIGS. 8A to 8C), as shown in FIG. 8B, in the direction of arrow 73c on the mounting plate 41 sliding in the direction of arrow 73c on the mounting plate 41. At this time, the spring bracket 71 moves in the direction of arrow 71e against the force of spring 72 due to the action of the cam inclination 70e of the slider cam 70 and the cam inclination 71h of the spring bracket 71. Here, until the cam apex 70c of the slider cam 70 and the cam apex 71c of the spring bracket 71 come into contact, the force of the spring 72 returns the slider cam 70 in the direction opposite to arrow 73c. Therefore, when the operation of closing the pair of enclosures 10 is stopped, a suction force in the opening direction is generated and the pair of enclosures 10 returns to the open state of FIG. 8A. Here, the load generator U70 and the arm 60 and arm shaft 61 in the connection U60 constitute the suction mechanism, with the load generator U70 serving as the main part of the suction mechanism that generates the suction force in the opening direction on the pair of enclosures 10.

In the intermediate state of FIG. 8B, when the contact point between the cam apex 70c of the slider cam 70 and the cam apex 71c of the spring bracket 71 is exceeded, the force of spring 72 and the cam inclination 70d of the slider cam 70 and 71i of the spring bracket 71 to slide in the direction of arrow 73c due to the force exerted by spring 72. Therefore, a suction force in the closing direction is generated and the hinge unit B is closed with a weak operating force, as shown in FIG. 8C. The load generator U70 thus serves as the main part of the suction mechanism that generates the suction force in the closing direction on the pair of enclosures 10. As can be seen in FIG. 8A to FIG. 8C, the cam apex 71c of the spring bracket 71 is in contact with the cam apex 70c of the slider cam 70 in the intermediate state, and the cams are slanted differently on that border. The load generator U70, which constitutes the suction mechanism, generates a non-linear load between the base frame 40 and the mounting plate 41. Due to the non-linear loading of the suction mechanism, the enclosure 10 is subjected to suction action in both the opening and closing direction, which enables a high quality opening and closing action to be achieved.

In the open state of FIG. 8A and in the closed state of FIG. 8C, the cam apex 70c in the slider cam 70 is located in the cam troughs 71f and 71g at both ends in the cam of the spring bracket 71. Therefore, the force of the spring 72 holds the slider cam 70 in that position. This allows the hinge holding device to securely hold the hinge unit B in the open or closed state.

Here, the cam inclination in the spring bracket 71 is different on the opening side and the closing side across the cam apex 71c, with the cam inclination 71h from the hinge holding device from the opening state to the intermediate state being steeper than the cam inclination 71i from the intermediate state to the closing state. This increases the holding force when the flexible display sheet 30 is unfolded, enabling stable viewing of the screen. In addition, the cam inclination 71i of the spring bracket 71 is loose, so that the flexible display sheet 30 does not require a great deal of force when opening, allowing for light operation.

The coupling U60 of the invention has a synchronous gear 62 as described above. For this purpose, only one mounting plate 41 is provided with a load generator U70, so that the other mounting plate 41 can also perform suction and holding operations. Of course, it is also possible to further reduce the mechanism losses by installing the load generator U70 on both of the pair of mounting plates 41.

In the present invention, the guide device U50 described in FIG. 4 is combined with the hinge holding devices U60 and U70 to form the hinge unit B. The hinge unit B is not limited to the guide device U50 described in FIG. 4, other guide devices may be used, or the guide device may be omitted and the hinge, and hinge unit B may be made up of only the holding device.

As described above, a hinge holding device for holding a pair of enclosures 10 in an open or closed state, comprising a base frame 40, which is sandwiched between said pair of enclosures 10 and which supports each of said enclosures 10 in an openable and closable manner, and a suction mechanism with a load generator U 70 located inside at least one of said pair of enclosures 10, and the suction mechanism could generate a non-linear load between the base frame 40 and one of the enclosures 10 to keep one of the enclosures open and closed to the base frame 40.

The mechanism of the hinge holding device is described in the examples of the present invention, using an electronic device with a flexible display sheet as an example. However, the hinge holding device of the invention is not limited to the use of flexible display sheets, but can be applied to a variety of hinges, for example, to electronic devices such as notebook computers with a display sheet in one housing and a keyboard in the other housing, and other fittings.

The hinge holding device of the present invention was configured as described above, so that the open and closed states of the pair of enclosures 10 could be held securely without loss of mechanism.

The invention is suitable for use in, for example, mobile phones, electronic diaries, PDAs, netbooks, video display devices, portable game consoles and notebook computers, as well as folding electronic devices using this hinge holding device. The hinge holding device of the present invention is not only used for mobile phones, but can be widely used for various hinges, as described above.

What is claimed is:

1. A hinge holding device for holding a pair of enclosures in an open or closed state, comprising:
    a base frame sandwiched between said pair of enclosures and supporting said pair of enclosures in an open or closed state each, and
    a suction mechanism in which a load generator is located within at least one of said pair of enclosures, said suction mechanism generating a non-linear load between the base frame and one of the enclosures to maintain the open and closed state of the one enclosure with respect to the base frame.

2. The hinge holding device as claimed in claim 1, wherein the suction mechanism has an arm pivotably supported by the base frame and slidably connected to one of the enclosures, and wherein the load generator controls the sliding movement between the arm and one of the enclosures.

3. The hinge holding device as claimed in claim 2, wherein the load generator comprises a slider cam connected to the arm and sliding against one of the enclosures, and a spring bracket on one of the enclosures and moving in a first direction different from the sliding direction.

4. The hinge holding device as claimed in claim 3, wherein a cam apex of a cam on the slider cam and a cam apex of a cam on the spring bracket contact each other in an intermediate state between the open and closed states of one of the enclosures with respect to the base frame.

5. The hinge holding device according to claim 4, wherein the load generator reduces the load exerted by the spring bracket on the slider cam as it approaches the open or closed state of one of the enclosures from the intermediate state.

6. The hinge holding device according to claim 3, wherein the slider cam is rotatably supported on the arm around an axis that is parallel to the open/close axis of one of the enclosures.

7. The hinge holding device according to claim 1, wherein the device is an electronic device.

* * * * *